United States Patent [19]

Idesawa

[11] Patent Number: 4,480,726
[45] Date of Patent: Nov. 6, 1984

[54] ARRANGEMENT FOR AUTOMATIC ADJUSTMENT OF BRAKING GAPS IN DRUM BRAKES

[75] Inventor: Isao Idesawa, Nagano, Japan

[73] Assignee: Nisshin Kogyo Kabushiki Kaisha, Japan

[21] Appl. No.: 319,588

[22] Filed: Nov. 9, 1981

[30] Foreign Application Priority Data

Nov. 20, 1980 [JP] Japan .................. 55-166301[U]
Dec. 23, 1980 [JP] Japan .................. 55-185183[U]
Dec. 23, 1980 [JP] Japan .................. 55-185184[U]

[51] Int. Cl.³ ............................................. F16D 65/56
[52] U.S. Cl. .................. 188/79.5 P; 188/196 BA; 188/79.5 SS
[58] Field of Search .............. 188/79.5 R, 79.5 P, 188/79.5 GE, 79.5 K, 79.5 SS, 79.5 GT, 79.5 SC, 196 R, 196 BA, 196 V, 79.5 S; 192/111 A

[56] References Cited

U.S. PATENT DOCUMENTS

| 3,621,947 | 11/1971 | Margetts | 188/79.5 P |
|---|---|---|---|
| 4,051,928 | 10/1977 | Hayashida | 188/196 BA |
| 4,061,211 | 12/1977 | Hoshino et al. | 188/79.5 P |
| 4,079,819 | 3/1978 | Shirai et al. | 188/79.5 P |
| 4,276,966 | 7/1981 | Ayers | 188/196 BA |
| 4,375,252 | 3/1983 | Aono et al. | 188/79.5 P |

FOREIGN PATENT DOCUMENTS

| 2165733 | 7/1973 | Fed. Rep. of Germany | 188/79.5 GE |
|---|---|---|---|
| 2708813 | 9/1977 | Fed. Rep. of Germany | 188/79.5 GE |
| 56-18133 | 2/1981 | Japan | 188/79.5 GE |
| 2090635 | 7/1982 | United Kingdom | 188/79.5 R |

Primary Examiner—Douglas C. Butler
Assistant Examiner—R. R. Diefendorf
Attorney, Agent, or Firm—Cantor and Lessler

[57] ABSTRACT

An arrangement for automatic adjustment of a braking gap in a drum brake of the type in which a pair of brake shoes is expanded (moved away from each other) into engagement with the inside face of a brake drum. A brake lever abuts at its one end upon one brake shoe to cause extension of the shoe. A support shaft is extensible at a right angle with the brake lever and includes a portion tapered in its extending direction. An adjusting lever is loosely inserted over the support shaft and has its one end abutting upon one end face of the brake lever. An adjusting gear for permitting extension of an adjusting member engages with the other pawl-shaped end of the adjusting lever. A compression spring is interposed between the extended head of the support shaft and the adjusting lever. A predetermined load applied on the spring causes the adjusting lever to be biased toward the brake lever and urged against the tapered face of the support shaft.

5 Claims, 8 Drawing Figures

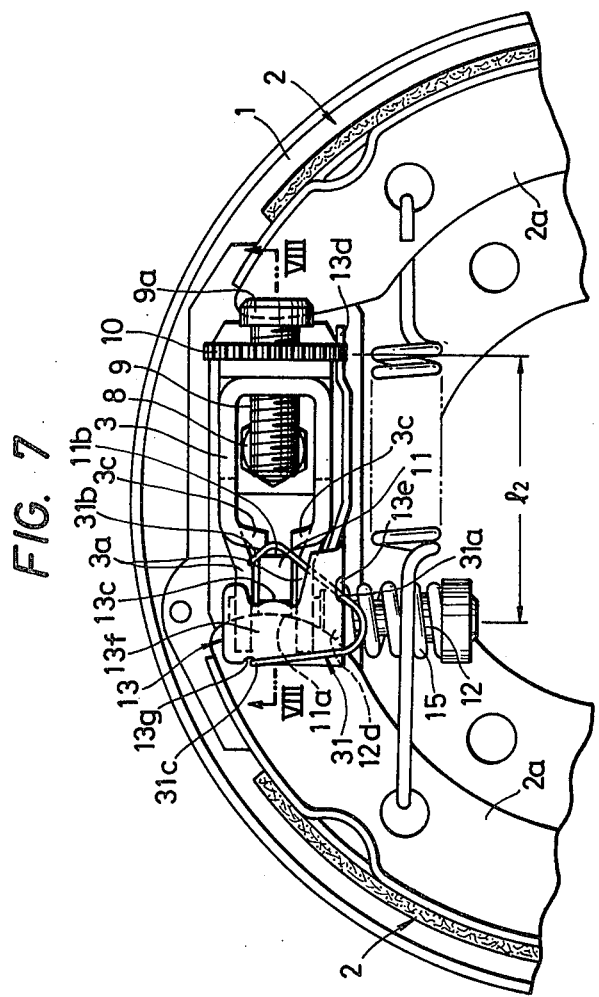

ARRANGEMENT FOR AUTOMATIC ADJUSTMENT OF BRAKING GAPS IN DRUM BRAKES

BACKGROUND OF THE INVENTION

The present invention relates to an arrangement for automatic adjustment of a braking gap in a drum brake of the type in which, for braking, a pair of brake shoes is expanded into engagement with the inside face of a brake drum.

In the conventional braking gap adjuster arrangement of this type, the braking gap is adjusted by turning an adjusting gear by an adjusting lever to cause extension of an adjusting member. In braking, however, rotation of the brake lever and hence adjustment of the braking gap undergo variations, i.e., are set to too large magnitudes due to the compressive deformation of the linings, the deformation of the overall brake shoes and so on, resulting in generation of rattles and dragging of the linings. In addition, violent turning of the brake lever exerts an over load on the adjusting lever, leading to a possibility that it will be damaged or impaired.

SUMMARY OF THE INVENTION

The present invention provides a solution to the above-mentioned problems.

A main object of the invention is therefore to provide an automatic braking gap adjuster arrangement suitable for use with the drum brake of the aforesaid type, which avoids over-large adjustment of the braking gap and prevents application of an overload on the adjusting lever so as to keep it from being damaged or impaired. According to the invention, this object is achieved by provision of an arrangement for automatic adjustment of the braking gap in a drum brake of the type in which a pair of brake shoes is expanded into engagement with the inside face of a brake drum, comprising in combination a brake lever which abuts at one end upon one brake shoe to cause extension of said shoe, a support shaft which is extensible at a right angle with said brake lever and includes a portion tapered in its extending direction, an adjusting lever which is loosely inserted over said support shaft and has one end abutting upon one end face of said brake lever, an adjusting gear for permitting extension of an adjusting member, said gear engaging with the other pawl-shaped end of said adjusting lever, and a compression spring interposed between the extended head of said support shaft and the said adjusting lever, a predetermined load applied on the said spring causing said adjusting lever to be biased toward said brake lever and urged against the tapered face of said support shaft.

Another object of the invention is to provide an automatic braking gap adjuster arrangement for the drum brake of the aforesaid type, which reduces dimensional variations as much as possible in a state where the pawl of the adjusting lever is in engagement with the adjusting gear, whereby adjustment of the braking gap is effected stably and surely, and places a limitation on the retraction of the brake lever in its inoperative direction. According to the invention, this object is achieved by provision of the arrangement of the aforesaid type in which the said support shaft to which the brake lever is secured is rotatably mounted on a sliding block in the form of a substantially U-shape, which is mounted on a back plate for sliding movement in the direction of expansion of the brake shoes, and supports the adjusting member in an extensible manner, and in which part of the side walls of the said sliding block is inwardly bent to form a stopper portion, upon which the inoperative side of the brake lever abuts, said stopper portion placing a limitation on the retraction of the brake lever in its inoperative direction. According to this aspect of the invention, it is possible to place a limitation on the retraction of the brake lever in its inoperative direction with ease and sureness, but without recourse to any special stopper member. This reduces the number of parts and facilitates assembling. In other words, it is possible to reduce allowance that increases with an increase in the number of parts and, hence, prevent more effectively dimensional variations in a state where the pawl of the adjusting lever is in engagement with the adjusting gear.

A further object of the present invention is to provide an automatic braking gap adjuster arrangement which, in braking, conveys the rotational force of the brake lever to the adjusting lever without causing a loss of strokes, thus assuring stable and positive adjustment of the braking gap. According to the invention, this object is achieved by provision of the arrangement of the aforesaid type, in which the said adjusting lever is constantly urged against the said brake lever by disposing the spring member across both levers.

BRIEF DESCRIPTION OF THE DRAWINGS

The above-mentioned objects and other objects of the present invention will be become apparent from the following detailed explanation, which is given by way of exemplification only, with reference to the accompanying drawings in which:

FIG. 7 is a front view of the essential parts of a further embodiment of the invention, in which stopper portions are formed on the sliding block of the drum brake illustrated in FIG. 1, and the brake lever is urged against the adjusting lever by a spring member.

DETAILED EXPLANATION OF PREFERRED EMBODIMENTS

Figure 1:
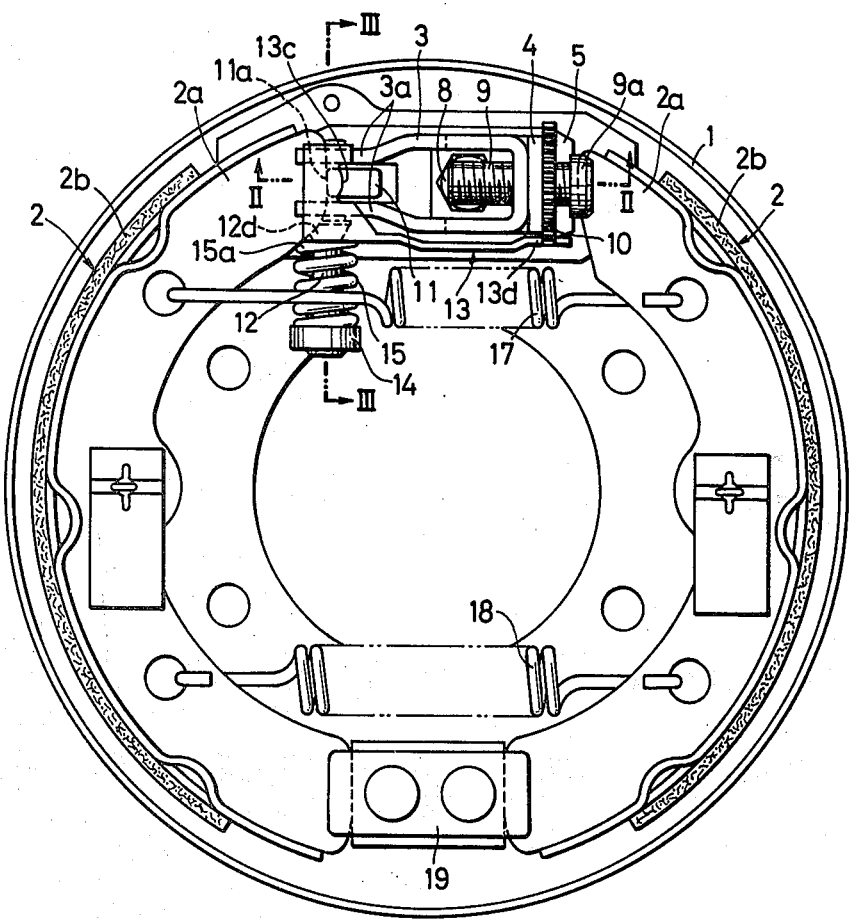
FIG. 1 is a front view of one embodiment of the invention, which is shown to be applicable to a drum brake of the type in which one brake shoe is urged against the drum, and the other brake shoe is urged against the drum by the resulting reaction force.
Figure 2:
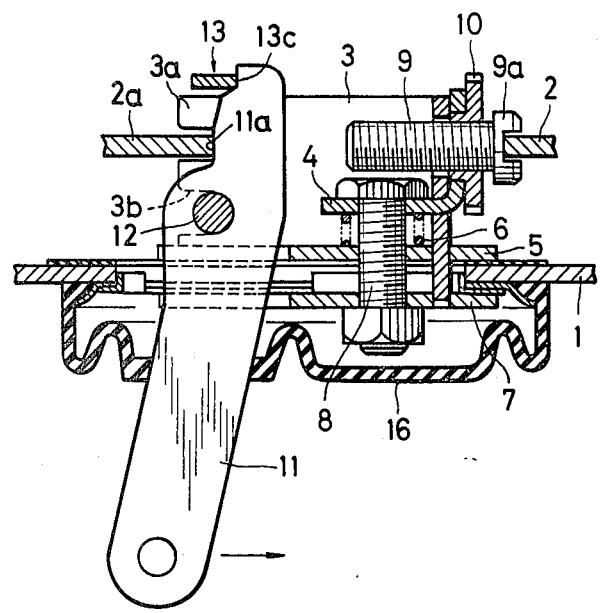
FIG. 2 is a sectional view taken along the line II—II of FIG. 1.
Figure 3:
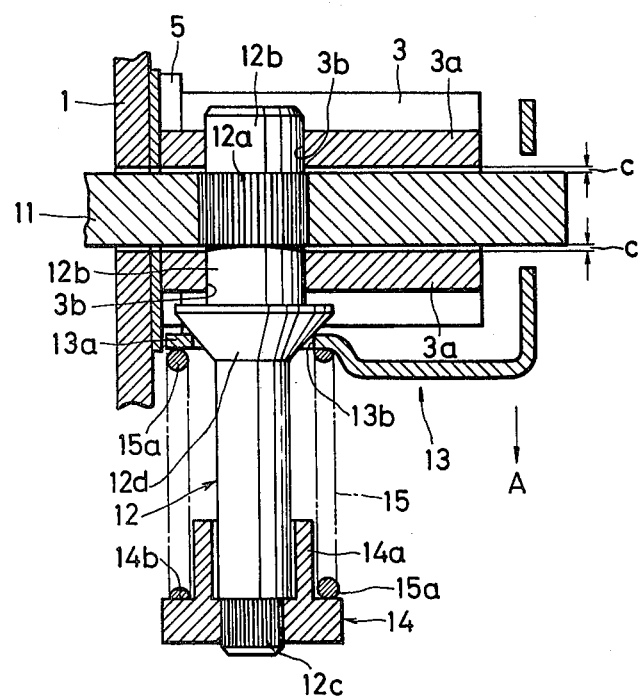
FIG. 3 is a sectional view taken along the line III—III of FIG. 1.

Referring to the drawings, in particular to FIGS. 1 to 3, there is shown one embodiment of the invention. A back plate 1 includes inside a pair of brake shoes 2 and is fixed to a stationary part of a vehicle body.

Formed into a substantial U-shape, a sliding block 3 is disposed between brake shoes 2 at one end thereof. A rattle-preventing spring 6 is interposed between a fixed plate 4 taking abutment upon the sliding block 3 and a slide plate 5, and the back plate 1 is held in place between the slide plate 5 and a set plate 7 by means of a clamp bolt 8. The sliding block 3 can thus be slid on the back plate 1 in the direction in which the brake shoes 2 move away from each other, i.e., in the direction of expansion of the shoes.

Threaded into the sliding block 3, an adjusting member 9 includes its head 9a fitted into a shoe web 2a located on the trailing side, and is extensible in response to the rotation of an adjusting gear 10. A brake lever 11 is disposed between the side walls 3a of an opening in the sliding block 3 with gaps C, and includes a support shaft 12 extending inwardly with its serrated portion 12a being fixed. The shaft 12 is rotatably engaged at its straight portion 12b with notches 3b on the sliding block 3. One end face 11a of the brake lever 11 then abuts upon shoe web 2a located on the leading side. An adjusting lever 13 is provided for rotating the adjusting gear 10, and includes a depressed portion 13a forming an opening 13b of large diameter, in which the support shaft 12 is loosely inserted. The adjusting lever 13 has one upper end 13c abutting upon one upper end face 11a of the brake lever 11 located on the leading side and the other pawl-shaped end 13d engaging with the adjusting gear 10. It is noted that the adjusting lever 13 may be arranged in such a manner that its one end abuts upon one lower end face of the brake lever 11 located on the trailing side.

A spring guide 14 is forcedly inserted in the serrated head 12c of the support shaft 12. Having both ends 15a polished, a compression spring 15 is disposed between a stopper portion 14b of the guide 14 and the depressed portion 13a of the lever 13 along the guide portion 14a of the spring guide 14. A predetermined load of the compression spring permits the adjusting lever 13 to be biased toward the brake lever 11, so that the opening 13b in the adjusting lever 13 is urged against an intermediate portion of the support shaft 12, which portion is tapered in its extending direction, as shown at 12d.

A dust boot 16 is provided with its end being locked on the back plate 1. A return spring 17 is provided in the vicinity of the sliding block 3 and between the brake shoes 2 and 2, and an anchor spring 18 is provided in the vicinity of an anchor 19 and between the brake shoes 2 and 2.

Operation of the illustrated arrangement will now be described.

When the brake lever 11 is pivoted in the direction shown by an arrow in FIG. 2 by giving a pull to a wire (not illustrated) connected to the brake lever 11, the brake shoe 2 located on the leading side is expanded to urge its lining 2b against the inner surface of a brake drum. The resulting reaction force causes the sliding block 3 to slide on the back plate 1 and the brake shoe 2 located on the trailing side to expand, so that its lining 2b is urged against the opposite inner surface of the brake drum for braking.

In this case, the adjusting lever 13 pivots with pivotal movement of the brake lever 11. However, no rotation of the adjusting gear 10 takes place due to the fact that play is given between the pawl 13d of the adjusting lever 13 and the teeth of the adjusting gear 10.

As the abrasion losses of the linings 2b and 2b reach a given amount owing to repeated braking, the amount of pivotal movement of the brake lever 11 increases with attendant increases in the amount of pivotal movement of the adjusting lever 13. This results in elimination of the play between the pawl 13d and the teeth of the adjusting gear 10 and hence rotation of the latter. The adjusting member 9 then extends a length corresponding to the abrasion losses of the linings 2b and 2b, so that the braking gap is always kept constant in an automatic manner. The pawl 13d of the adjusting lever 13 advances over one tooth of the adjusting gear 10 to the next one, whereby the adjusting lever 13 returns to the normal position. The return of the lever 13 to the normal position can take place surely and smoothly without causing any reversal of the gear 10, since the gaps C and C between the brake lever 11 and the side walls 3a and 3a of the opening in the sliding block 3 provide for retreat for the lever 13.

In the automatic adjustment of the braking gap taking place during braking, the linings 2b and 2b may undergo compressive deformation, the brake drum and other parts may suffer thermal deformation, and the overall brake shoes 2 may experience deformation. When the braking gap becomes zero due to such deformation and thereafter, a pivotal force is applied on the brake lever 11, the adjusting lever 13 cannot pivot. The reason is that adjusting gear 10 is held between brake shoes 2a and block 3 and cannot rotate, thereby locking adjusting lever 13 against pivotal movement because pawl 13d is engaged with the teeth of gear 10. In this connection, it will be appreciated that adjusting lever 13 can only move downwardly as seen in FIGS. 1 and 3 since pivotal movement is restrained. But, since upper end 13c of the adjusting lever 13 is engaged with upper end face 11a of brake lever 11, the downward movement is restrained. The continuing pressure of upper end face 11a on upper end 13c causes adjusting lever 13 to slide to the left as seen in FIGS. 1 and 3, thereby resulting in a downward movement of lever 13 along tapered face 12d of support shaft 12. The net result is a movement of adjusting lever 13 in a diagonal direction downwardly and to the left. Therefore, the rotational force of the shaft 12 exerted by the pivotal movement of the brake lever 11 is not transmitted to the adjusting lever 13, assuring that neither over-adjustment of the braking gap nor application of an excessive load on the lever 13 occurs. Thereupon, the adjusting lever 13 can surely be restored to the original position along the guide portion 14a of the spring guide 14 due to the restoring properties of the compression spring 15 without changing direction.

Figure 4:
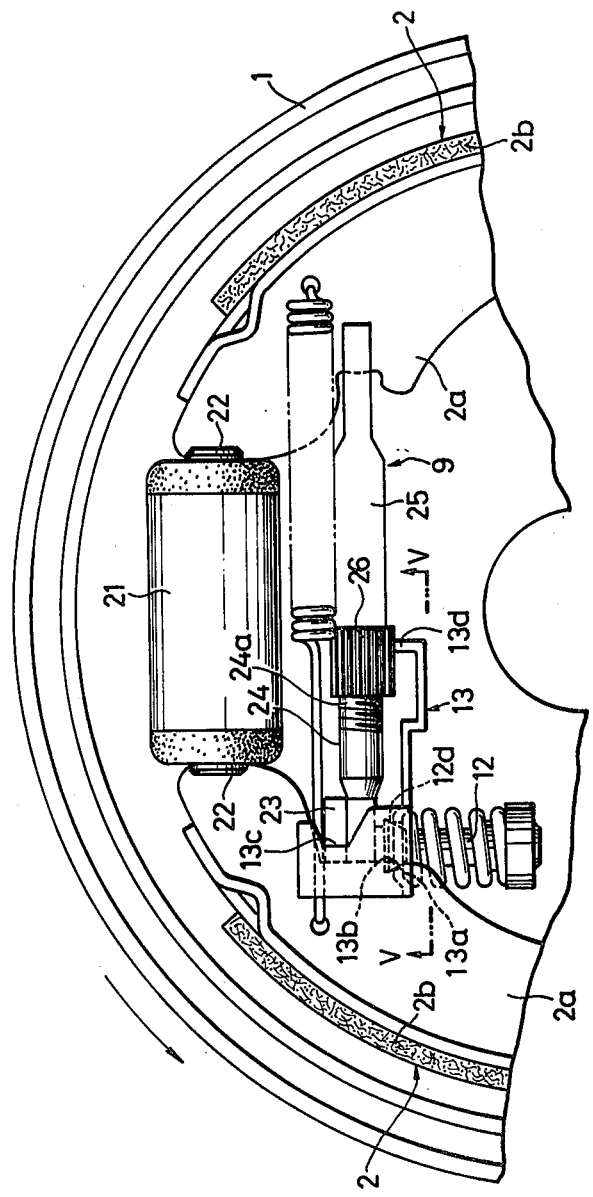
FIG. 4 is a front view of the essential parts of another embodiment of the invention, which is shown to be applicable to a drum brake of the type in which, for braking, a pair of brake shoes are urged against the drum by means of a wheel cylinder.
Figure 5:
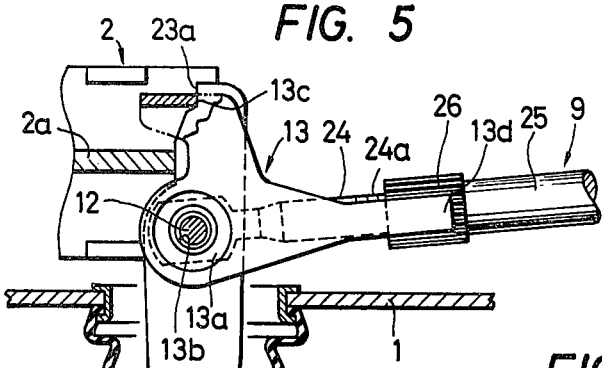
FIG. 5 is a sectional view taken along the line V—V of FIG. 4.
Figure 6:
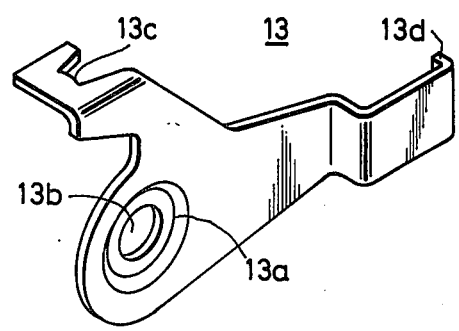
FIG. 6 is a perspective view of the adjusting lever used in FIG. 4.

Referring to FIGS. 4 to 6, there is shown another embodiment of the invention. According to this embodiment, a back plate 1 is fixedly provided with a wheel cylinder 21, and one end of shoe webs 2a of a pair of brake shoes 2 are caused to abut upon a pair of pistons 22 of the cylinder 21. A support shaft 12 is supported on a parking brake lever 23 in such a manner that it is positioned at a right angle with the plane of the lever. In the vicinity of the wheel cylinder 21, there is provided an adjusting member 9 formed by inserting a first strut 24 into a second strut 25, said first strut having its outside threaded at 24a. The support shaft 12 is rotatably supported on one end of the first strut 24. The first strut 24 is inserted into the second strut 25 with one end abutting upon the shoe web 2a located on the trailing side. An adjusting nut 26 is screwed onto the threaded portion 24a of the first strut 24, and abuts upon the end face of an opening in the second strut 25. Turning of the adjusting nut 26 causes the first strut 24 to extend from the second strut 25, whereby the brake shoes 2 are moved away from each other to adjust the braking gap.

The adjusting lever 13 is loosely inserted over the support shaft 12 through its opening 13b of large diameter. The peripheral edge of the opening 13b is depressed at 13a toward the parking brake 23. The adjusting lever 13 is pivotally supported by causing the depressed portion 13a to abut on a tapered face 12d of the support shaft 12. The adjusting lever 13 abuts at its one upper end 13c upn one end face of the parking brake lever 23 located on the leading side. The other pawl-shaped end 13d thereof engages with the ratchet tooth of the adjusting nut 26.

Operation of the illustrated arrangement will now be described.

A pressurized liquid is fed to the wheel cylinder 21 by actuation of a master cylinder (not illustrated). This then causes actuation of the pistons 22 and expansion of a pair of brake shoes 2, so that the associated linings 2b slide on the inner face of the brake drum for braking. To apply the side brakes, the parking brake lever 23 is pivoted in the direction indicated by an arrow in FIG. 5. Such pivotal movement causes expansion of the brake shoe positioned on the leading side and its lining 2b to be urged against the brake drum. The resulting reaction force causes the brake shoe 2 positioned on the trailing side to be pushed and expanded by the first and second struts 24 and 25. The associated lining 2b is then urged against the opposite side of the brake drum for braking.

When the abrasion losses of the linings 2b reach a given value, the amount of pivotal movement of the parking brake lever 23 increases with attendant increases in the amount of pivotal movement of the adjusting lever 13, resulting in turning of the adjusting nut 26. Turning of the adjusting nut 26 causes the first strut 24 to extend out of the second strut 25 by a length corresponding to the abrasion losses of the linings 2b. In this way, the automatic adjustment of the braking gap is accomplished.

Figure 8:
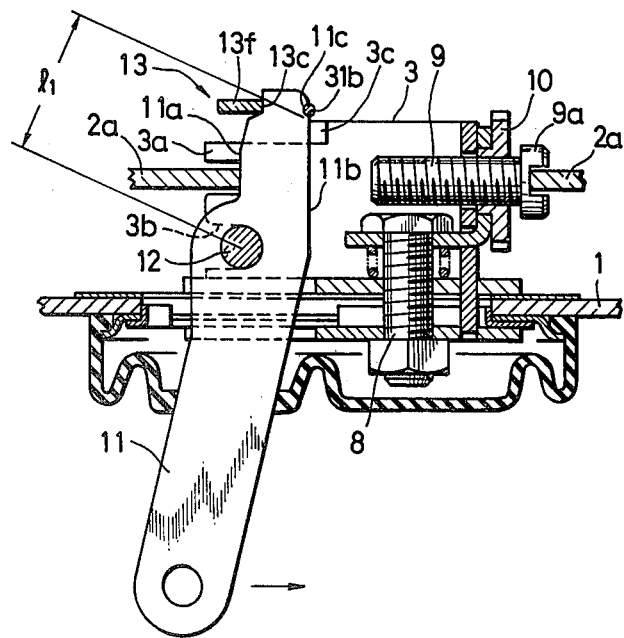
FIG. 8 is a sectional view taken along the line VIII—VIII of FIG. 7.

Referring to FIGS. 7 and 8, there is shown a further embodiment of the invention.

According to this embodiment, stopper portions 3c are formed by inwardly bending the upper portions of side walls 3a of an opening in a sliding block 3. An end face 11b of the brake lever 11 positioned on its inoperative side abuts upon the stoppers 3c, thus placing a limitation on the retraction of the brake lever 11 in its retraction direction.

The limitation to be placed on the retraction of the brake lever 11 in its inoperative direction is then set when the brake lever 11 is rotatably engaged with the sliding block 3, and this block is slidingly mounted on a back plate 1 by a clamp bolt 8. This renders it possible to reduce extremely a variation in the movement of a pawl 13d of an adjusting lever 13 in a state where the pawl is in engagement with an adjusting gear 10.

It is noted that the above-mentioned stoppers 3c may be formed not only on the upper portions of the side walls 3a of the opening but also on the lower portions thereof and so on. If a distance $l_1$ between the point on which the stoppers 3c of the sliding block 3 abut upon the inoperative end face of the brake lever 11 and the central point of a support shaft 12 is increased and put close to a distance $l_2$ between the pawl 13d of the adjusting lever 13 and the central point of the support shaft 12, then it is possible to reduce as much as possible a variation in the movement of the pawl 13d in a state where it is in engagement with the adjusting gear 10.

A spring member 31 has its intermediate portion 31a inserted through a holding slot 13e in the adjusting lever 13. This spring member then passes below the upper face 13f of the adjusting lever 13, and is locked at its one end 31b in a locking groove 11c formed on the upper portion of the inoperative end face 11b of the brake lever 11, while it passes above the upper face 13f, and is locked at its other end 31c in a locking groove 13g formed on the portion of the adjusting lever 13 positioned outside of the back plate. Since the spring member is thus disposed across both levers 11 and 13, the adjusting lever 13 is constantly urged against the operative end face 11a of the brake lever 11.

As a result, since the rotational force of the brake lever 11 is conveyed to the adjusting lever 13 without causing a loss of strokes, constantly stable and sure adjustment of the braking gap can be effected. In addition, since the spring member 31 has its intermediate portion 31a inserted through the holding slot 13e in the adjusting lever 13 and is disposed across both levers 11 and 13, it is possible to surely urge the adjusting lever 13 upon the brake lever 11. Thus, the arrangement according to the invention can be used for a longer period of time with no risk of its disengagement.

With the arrangement which, as mentioned above, comprises a brake lever which abuts at its one end upon one brake shoe to cause extension of said shoe, a support shaft which is extensible at a right angle with said brake lever and includes a portion tapered in its extending direction, an adjusting lever which is loosely inserted over said support shaft and has its one end abutting upon one end face of said brake lever, an adjusting gear for permitting extension of an adjusting member, said gear engaging with the other pawl-shaped end of said adjusting lever, and a compression spring interposed between the extended head of said support shaft and the said adjusting lever, a predetermined load applied on said spring causing said adjusting lever to be biassed toward said brake lever and urged gainst the tapered face of said support shaft, the rotational force of the brake lever can surely be transmitted to the adjusting lever. This causes extension of the adjusting member, so that adjustment of the braking gap is automatically effected with smoothness and sureness. Even when an excessive rotational force is applied on the brake lever, the adjusting lever inserted over the support shaft is moved away from the brake lever against the compression spring toward one brake shoe. Hence, since the rotational force of the brake lever is not transmitted to the adjusting lever, no rotation of the adjusting gear takes place. Since the adjusting lever then returns smoothly and surely to its original position under the influence of the compression spring, over-large adjustment of the braking gap is effectively prevented with neither rattles nor dragging of the linings, thus assuring constantly stable braking. In addition, since no excessive load is applied on the adjusting lever, it is not positively damaged or impaired, so that it can surely be used for braking over an extended period of time.

In another arrangement, the brake lever is disposed between the side walls of the opening in the sliding block in the form of a substantial U-shape, and part of the side walls is inwardly bent to form a stopper portion. If the inooerative side of the brake lever is permitted to abut upon this stopper portion, a limitation can easily and surely be placed on the retraction of the brake lever in its inoperative direction is a state where the sliding block is attached to the back plate by means of a clamp bolt. In this way, since the stopper portion for placing a limitation on the retraction of the brake lever can be formed by bending inwardly part of the block without recourse to any special separate member, there is no increase in the number of parts. This reduces as much as possible dimensional variations in a state where the pawl of the adjusting lever is in engagement with the adjusting gear without causing an increase in allowance. Thus, adjustment of the braking gap can always be effected with sureness.

If the stopper portion of the sliding block is spaced away from the support shaft to place a limitation on the retraction of the brake lever in its inoperative direction, dimensional variations of the pawl of the adjusting lever can be reduced to a lesser extent.

The adjusting lever can constantly be urged against the brake lever by disposing a spring member across both levers. As a result, the rotational force of the brake lever is transmitted in braking to the adjusting lever without causing a loss of strokes, thus assuring more stable and surer adjustment of the braking gap. In addition, the adjusting lever can surely be urged against the brake lever, since the spring member is inserted through the holding slot in the adjusting lever, and disposed across both levers. Accordingly, the spring member can satisfactorily be used for a prolonged period of time with no risk of disengagement.

What is claimed is:

1. An arrangement for automatic adjustment of a braking gap in a drum brake of the type in which a pair of brake shoes is expanded into engagement with the inside face of a brake drum, comprising in combination a brake lever which abuts at one end upon one brake shoe to cause extension of said shoe, a support shaft which is extensible at a right angle with said brake lever and includes a portion intermediate the ends thereof which is tapered in its extending direction and a head end, an adjusting lever which is loosely inserted over said support shaft and having one end abutting upon one end face of said brake lever and the other end being pawl-shaped, an adjusting gear for permitting extension of an adjusting member, said gear engaging with the other pawl-shaped end of said adjusting lever, and a compression spring interposed between the head of said support shaft and the said adjusting lever, a predetermined load applied on said spring causing said adjusting lever to be biased toward said brake lever and urged against the tapered face of said support shaft, the support shaft to which the said brake lever is secured being rotatably mounted on a sliding block in the form of a substantial U-shape, which is mounted on a back plate for sliding movement in the direction of expansion of the brake shoes, and supporting the adjusting member in an extensible manner.

2. The arrangement as recited in claim 1, in which the support shaft to which the said brake lever is secured is rotatably mounted on the adjusting member comprising two elements each having one end abutting upon the brake shoes, which are provided in the vicinity of a wheel cylinder for causing expansion of the brake shoes.

3. The arrangement as recited in claim 1 or 2, in which the said adjusting lever is constantly urged against the said brake lever by disposing a spring member across both levers.

4. The arrangement as recited in claim 3, in which the said spring member is inserted at its intermediate portion through a holding slot formed on the said adjusting lever, and locked at its one end of the said adjusting lever and at its other end on the said brake lever.

5. The arrangement as recited in claim 1, in which part of the side walls of the said sliding block is inwardly bent to form a stopper portion, upon which the inoperative side of the brake lever abuts.

* * * * *